DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 22, 1974

918 O.G. 1328

T918,011

MOLDING RESIN COMPOSITIONS

William W. Blount, Jr., 1129 Oakleaf Drive 37663; Roger H. Calendine, 217 Elmhurst Drive 37663; and James L. Suggs, 4241 Maplewood St. 37660, all of Kingsport, Tenn.

Filed Oct. 2, 1972, Ser. No. 293,899

Int. Cl. C08b *21/08;* C08g *39/10*

U.S. Cl. 260—16

No Drawing. 10 Pages Specification

Thickened, unsaturated polyesters of 2,2,4-trimethyl-1,3-pentanediol or neopentyl glycol, a polyhydric alcohol, and maleic acid, when reacted with styrene or the like, particularly in the presence of leveling resins such as cellulose acetate butyrate, produce molded articles of good surface appearance and a high degree of pigment homogeneity. The unsaturated polyesters have a number average molecular weight of from about 1,000 to about 4,000, their glycol constituents comprise at least about 30 percent by weight of 2,2,4-trimethyl-1,3-pentanediol or neopentyl glycol or mixtures thereof, and the polyhydric alcohol constituent comprises about 1 to 20 mole percent of the glycol constituent. The polyhydric alcohol may be pentaerythritol, trimethylolpropane, trimethylolethane, glycerine, mannitol, or the like.